United States Patent
Sotto, II

(10) Patent No.: US 10,126,570 B2
(45) Date of Patent: Nov. 13, 2018

(54) INDOOR/OUTDOOR SUNGLASSES

(71) Applicant: Edward A. Sotto, II, Laguna Hills, CA (US)

(72) Inventor: Edward A. Sotto, II, Laguna Hills, CA (US)

( * ) Notice: Subject to any disclaimer, the term of this patent is extended or adjusted under 35 U.S.C. 154(b) by 0 days.

(21) Appl. No.: 15/357,049

(22) Filed: Nov. 21, 2016

(65) Prior Publication Data

US 2017/0146827 A1     May 25, 2017

Related U.S. Application Data

(60) Provisional application No. 62/257,899, filed on Nov. 20, 2015.

(51) Int. Cl.
| | |
|---|---|
| *G02C 7/10* | (2006.01) |
| *G02B 1/14* | (2015.01) |
| *G02B 1/11* | (2015.01) |
| *B29D 11/00* | (2006.01) |
| *G02B 1/04* | (2006.01) |

(52) U.S. Cl.
CPC ........ *G02C 7/105* (2013.01); *B29D 11/00884* (2013.01); *B29D 11/00923* (2013.01); *G02B 1/041* (2013.01); *G02B 1/11* (2013.01); *G02B 1/14* (2015.01); *G02C 7/102* (2013.01); *G02C 7/104* (2013.01); *G02C 2202/16* (2013.01)

(58) Field of Classification Search
CPC .... C07D 498/10; C07D 498/20; G02B 1/041; G02B 1/11; G02B 1/14; G02C 7/105; G02C 7/102; G02C 7/104; G02C 2202/16; B29D 11/00923; B29D 11/00884

USPC .................................................. 351/159.61
See application file for complete search history.

(56) References Cited

U.S. PATENT DOCUMENTS

| | | | |
|---|---|---|---|
| 4,259,406 A | 3/1981 | Borrelli | |
| 5,914,193 A | 6/1999 | Ono et al. | |
| 6,145,983 A | 11/2000 | Schiffer | |
| 8,342,680 B2 | 1/2013 | Wada | |
| 8,651,660 B2 | 2/2014 | Barzak et al. | |
| 8,998,407 B1 * | 4/2015 | Welt .................... | G02C 7/16 |
| | | | 351/45 |
| 2007/0081119 A1 | 4/2007 | Mayer | |
| 2007/0285613 A1 | 12/2007 | Hobbs | |

(Continued)

FOREIGN PATENT DOCUMENTS

| | | |
|---|---|---|
| WO | 2009145668 A1 | 3/2009 |
| WO | 2016054198 A1 | 4/2016 |

OTHER PUBLICATIONS

Double Gradient Mirror Clear Classic Sunglasses, Source: http://www.gogglesandglasses.com/Double-Gradient-Mirror-Clear-Classic-Sunglasses_p_8697.html Date Accessed: Oct. 6, 2016.

(Continued)

*Primary Examiner* — William R Alexander
*Assistant Examiner* — Henry A Duong
(74) *Attorney, Agent, or Firm* — Law Offices of Roland Tong

(57) ABSTRACT

Indoor/outdoor sunglasses include a lens having gradient tinted portions that partially conceal a wearer's eye, with an untinted or minimally tinted central region that provides a relatively wide, unrestricted field of lateral vision at far and middle distances, allowing the wearer to see clearly both indoors and outdoors.

1 Claim, 4 Drawing Sheets

(56) References Cited

U.S. PATENT DOCUMENTS

| | | | |
|---|---|---|---|
| 2011/0085127 A1* | 4/2011 | Wada | G02C 7/027 |
| | | | 351/45 |
| 2011/0141432 A1 | 6/2011 | Nesty | |
| 2015/0231839 A1 | 8/2015 | Su et al. | |
| 2016/0116718 A1* | 4/2016 | Hsu | G02B 5/22 |
| | | | 359/356 |

OTHER PUBLICATIONS

2016 Fashion Uv400 Pilot Sunglasses Women Metal Glasses for Men Eyewear High Quality Sunglass Female New Shades Outdoor Oculos De Sol Source: http://www.dhgate.com/product/2016-fashion-uv400-pilot-sunglasses-women/379832575.html Date Accessed: Oct. 6, 2016.

Wild Summer Double Gradient Horizon Sunglasses https://wildkissfashion.com/collections/sunglasses/products/wild-summer-double-gradient-horizon-sunglasses Date Accessed: Oct. 6, 2016.

Sunglasses With Gradient Lenses: What is the Point? Source: http://www.blickers.com/en/sunglasses-with-gradient-lenses/ Publication Date: Aug. 20, 2013 Date Accessed: Sep. 29, 2016.

* cited by examiner

INDOOR/OUTDOOR SUNGLASSES

CROSS-REFERENCE TO RELATED APPLICATIONS

This application claims the benefit of U.S. provisional application Ser. No. 62/257,899 filed Nov. 20, 2015, the disclosure of which is hereby incorporated in its entirety by reference herein.

TECHNICAL FIELD

The present disclosure relates to eyewear technology, and in particular, eyewear technology that allows sunglasses to be worn indoors while hiding the user's eyes.

BACKGROUND

Sunglasses have an obvious utilitarian value in that they protect the eyes from sunlight. Beyond this, they are valuable fashion accessories that can improve or enhance the symmetry of the wearer's face, while also creating an air of mystery and sex appeal by hiding the wearer's eyes. For this reason, many people desire to wear their sunglasses indoors as well as out. In addition, some types of sunglasses can protect wearers from harsh fluorescent light and harmful blue light emitted from indoor devices such as computer screens. However, conventional sunglasses can not be worn indoors because they block so much light that the wearer can not see well under artificial lighting conditions. Photochromic lenses, which adjust to changing levels of lighting, allow individuals to see clearly while wearing their sunglasses indoors, but do not have the same aesthetic appeal as conventional sunglasses because they do not hide the user's eyes. The above problems are addressed by this disclosure as summarized below.

SUMMARY

Eyewear according to the present disclosure includes a lens having gradient tinted portions that partially conceal a wearer's eye, with an untinted or minimally tinted central region that provides a relatively wide, unrestricted field of lateral vision at far and middle distances, allowing the wearer to see clearly both indoors and outdoors.

In one aspect of the disclosure, the lens includes a generally rectangular central region having a light blocking ratio, a first gradient region having a light blocking ratio that increases in a vertical direction, and a second gradient region having a light blocking ratio that increases in a horizontal direction. The light blocking ratio of the central region may vary with lighting conditions. The central region may extend horizontally from the nasal edge to an area between the vertical meridian and the temporal edge of the lens. The first gradient region may extend vertically from the upper edge of the lens to an area between the upper edge and the horizontal meridian of the lens. The second gradient region may extend horizontally from the temporal edge area between the vertical meridian and the temporal edge of the lens, and the light blocking ratio of the second gradient region may increase toward the temporal edge. The lens may also include a third gradient region having a light-blocking ratio that increases in a vertical direction opposite the direction of the first gradient region.

In another aspect of the disclosure, the lens includes generally rectangular central region, a first gradient region extending from the periphery of the central region to the upper edge of the lens, and a second gradient region extending from the periphery of the central region to the temporal edge of the lens. The central region has a light blocking ratio having a minimum value. The first gradient region has a light blocking ratio that increases continuously from the minimum value at the periphery of the central region to a maximum value at the upper edge of the lens. The second gradient region increases continuously from the minimum value at the periphery of the central region to the maximum at the temporal edge of the lens. The lens may also include a third gradient region extending from the periphery of the central region to the lower edge. The third gradient region may have a light blocking ratio that increases continuously from the minimum value at the periphery of the central region to a maximum value at the lower edge of the lens. The central region may include a first side bounded by the first gradient region, a second side bounded by the second gradient region, a third side bounded by the third gradient region, and a fourth side bounded by the nasal edge of the lens.

The present disclosure also includes a method of manufacturing eyewear, including: providing a photochromic lens with a light blocking ratio that varies with lighting conditions; creating a first gradient region with a light blocking ratio that increases in a vertical direction; and creating a second gradient region with a light blocking ratio that increases in a horizontal direction. The method may also include creating a third gradient region having a light blocking ratio that increases in an opposite vertical direction to the first gradient region, wherein the third gradient region is spaced from the first gradient region to define a central region.

The gradient regions may be formed by dipping an edge of the lens into a bath of dye solution continuously rotating the lens so that the submerged edge and two other edges are immersed in the bath, and slowly withdrawing the lens from the bath.

In some embodiments, the photochromic lens may include a substrate, a photochromic layer disposed on or in the substrate, a protective coating disposed over the photochromic layer, and a scratch resistant coating disposed over the protective coating. In the embodiments, the method may include applying a hardcoat on the back surface of the substrate before dipping the edges of the lens in the dye bath. The hardcoat may be a UV curable hardcoat applied to the lens by a spinning process. The method may further include applying an antiglare coating over the hardcoat.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
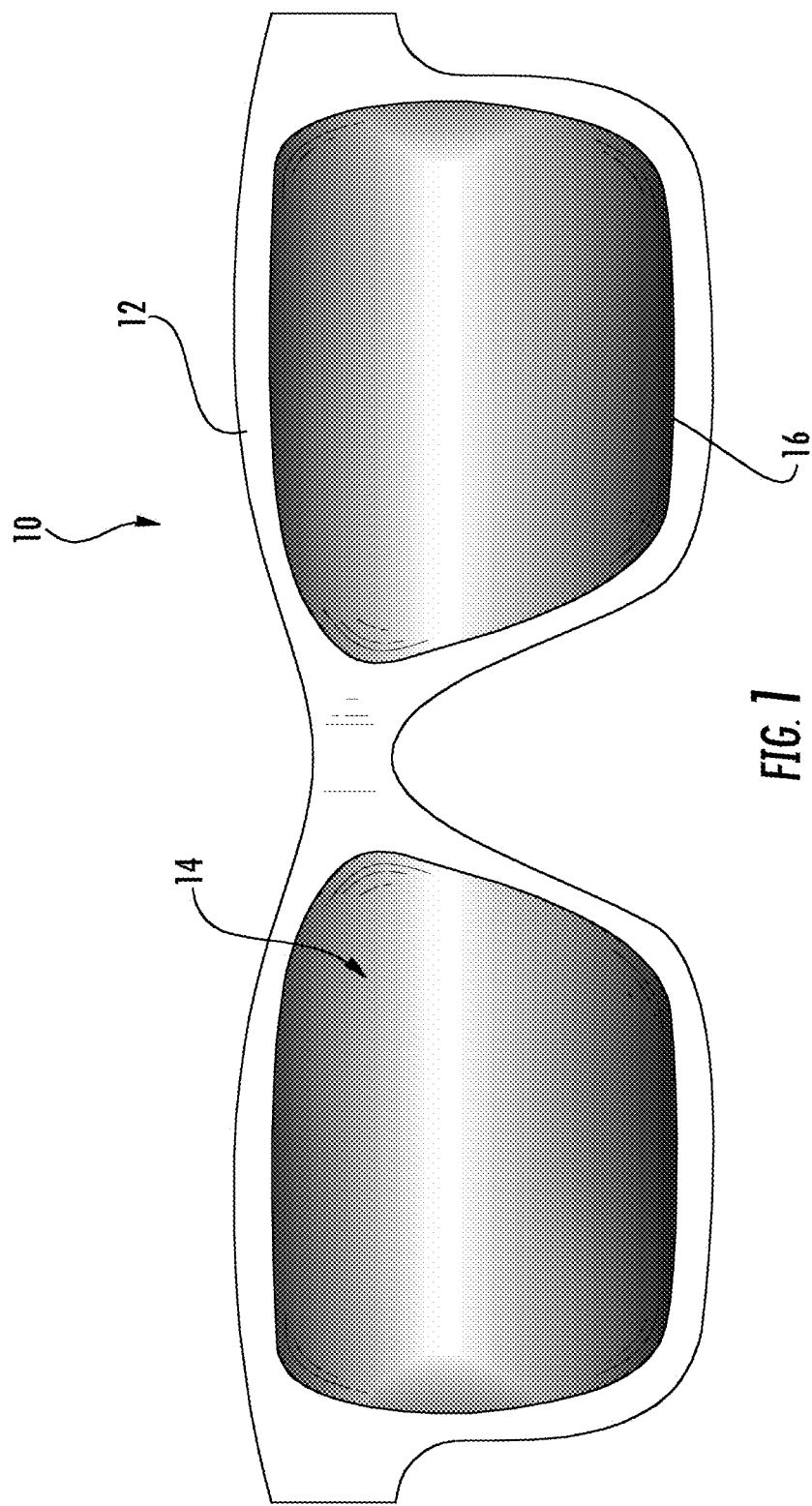
FIG. 1 is a front view of a pair of sunglasses according to the present disclosure.
Figure 2:
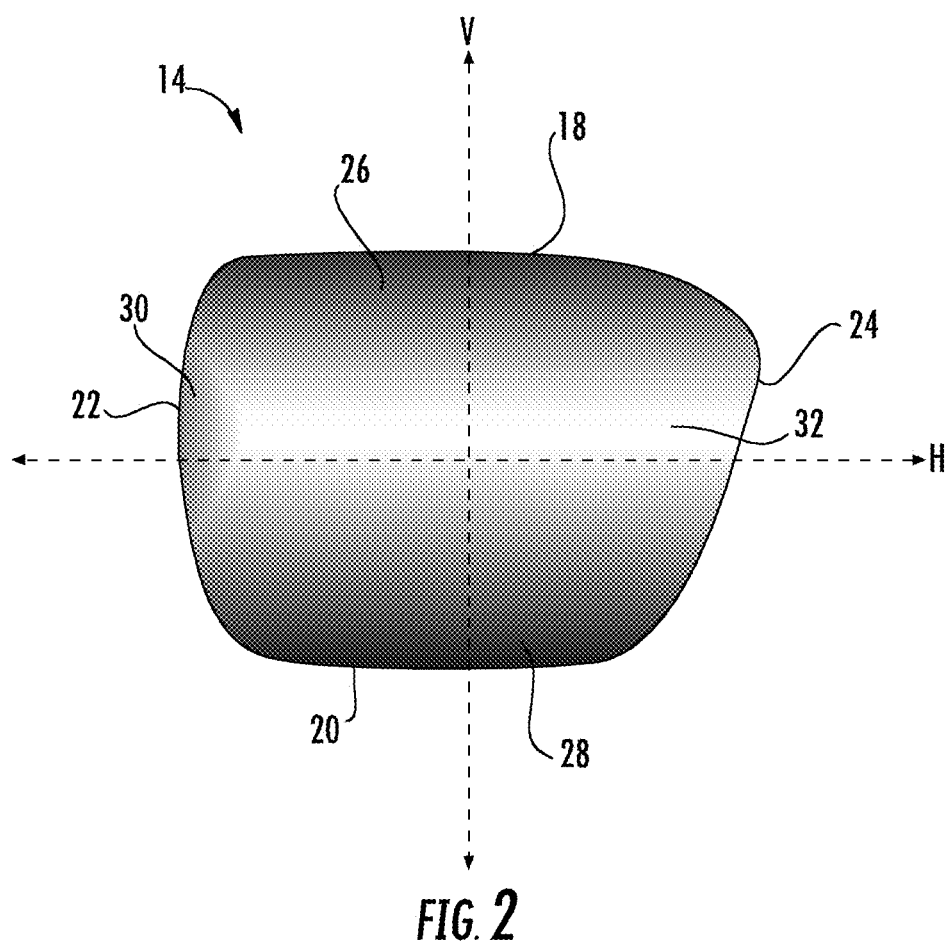
FIG. 2 is a front view of an eyeglass lens according to the present disclosure.

With reference to FIG. 1, the sunglasses of the present invention, identified in their entirety by the numeral 10, include a frame 12 and a pair of lenses 14, 16. As seen in FIG. 2, lens 14 includes a horizontal meridian H-H and vertical meridian V-V, wherein the area to the left of the horizontal meridian H-H is the temporal side of the lens 14, and the area to the right of the horizontal meridian H-H. The lens includes an upper edge 18, a lower edge 20, a temporal edge 22, and a nasal edge 24. An upper gradient region 26 extends downwardly from the upper edge 18 and covers approximately the top one-fifth of the lens 14. A lower gradient region 28 extends upwardly from the lower edge 20 and terminates at the horizontal meridian H-H. A side gradient region 30 extends in a nasal direction from the temporal edge 22 and covers approximately one-third to one fourth of the temporal side of each lens. A substantially rectangular central region 32 is bounded on top by the upper gradient region 26 and bounded below by the lower gradient region 28. The side gradient region 30 forms a boundary on the temporal side of the central region 32, and the nasal edge 24 of each lens 24, 26 forms a boundary on the nasal side of the central region 32. Lens 16 is a mirror image of lens 14. In other words, lens is the same shape and has the same gradients has lens 14, but the temporal side of the lens 16 is on the right of the horizontal meridian H-H, and the nasal side of the lens is on the left of the horizontal meridian H-H.

Each of the lenses 14, 16 is preferably a photochromic lens, and in one advantageous embodiment is a photochromic lens that can be at least partially activated behind the windshield of a car, such as, for instance, the type of photochromic lens that is marketed under the trademark TRANSITIONS® XTRACTIVE® by Transitions Optical, Limited. This type of lens, which is described in U.S. Pat. No. 7,166,357 B2 to Kumar et al., is highly desirable for both indoor and outdoor use because it provides protection from 100% of Ultraviolet A and Ultraviolet B radiation, while also blocking at least 34 percent of the harmful blue light indoors and 88 percent to 95 percent of harmful blue light outdoors. The light-blocking ratio R of this type of lens varies with lighting conditions as well as a variety of factors including the temperature and the lens material, but at a temperature of 73° F., the light-blocking ratio is typically about 17% indoors, and about 90% in full sunlight.

The light-blocking ratio of the central region 32 of each lens 14, 16 is the same as the initial light-blocking ratio R of an untreated photochromic lens; ie. about 17% indoors, and about 90% in full sunlight. The light-blocking ratio of each gradient region 26, 28, 30 increases by an amount that ranges from a minimum value m at its boundary with the central region 32 to a maximum value M at its outer boundary. More specifically, the light-blocking ratio of the upper gradient region 26 increases vertically in an upward direction, while the light blocking ratio of the lower gradient region 28 increases vertically in a downward direction and the blocking ratio of the side gradient region 30 increases horizontally in a temporal direction. The minimum value m is preferably equal to about 0%, while the maximum value M may be approximately 25%. The values m and M apply to the additive value of the gradients. When the pre-existing light-blocking ratio of each lens is taken into account, the light blocking ratio of each gradient ranges from about 17% at its boundary with the central region 32 to about 67% at the edges of the lens under indoor lighting conditions. In full sunlight, the light blocking ratio of each gradient may range from about 90% % at its boundary with the central region 32 to about 100% at the edges.

Each lens 14, 16 includes a pre-existing, semi-finished TRANSITIONS® XTRACTIVE® lens 33 with two additional layers. The pre-existing, semi-finished TRANSITIONS® XTRACTIVE® lens 33 includes four layers: a substrate 34 formed of an optical plastic such as polycarbonate or Trivex;™ a photochromic layer 36, which has been integrated either below the surface of the substrate 34 using an imbibing process, or on the surface of the substrate 34 using a transbonding process; a protective coating 38 disposed over the photochromic layer 36; and a scratch resistant layer 40 disposed over the protective coating 38. The additional layers include a ultraviolet-cured hardcoat 42 on the back surface of the substrate 34 and an anti-reflective or anti-glare coating 44 disposed over the hardcoat 42. The gradient regions 26, 28, and 30 are embedded in the hardcoat 42.

Figure 4:
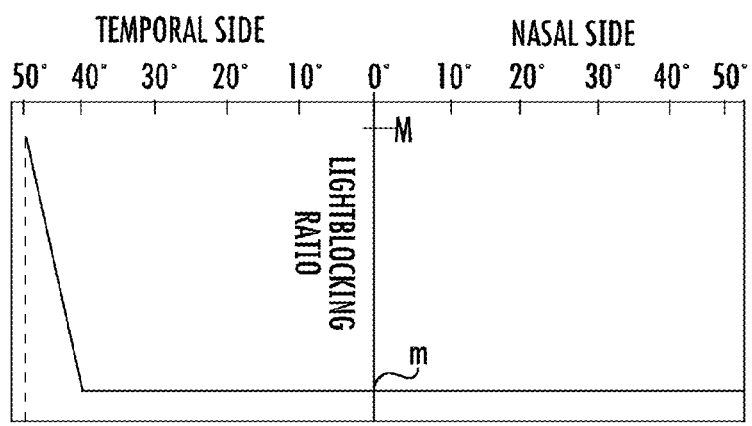
FIG. 4 is a table showing the distribution of the light-blocking ratio as a function of the lateral viewing angle, for the lens of FIG. 2.

FIG. 4 shows the distribution of the light-blocking ratio as a function of lateral angle from the vertical meridian V-V of the lens, as measured under indoor lighting conditions. The distribution is the same for outdoor lighting conditions, except that the values m and M are increased by an amount dependent on the brightness of the surrounding light. In this example, which is based on a lens encompassing a lateral angle of approximately 50° on each side of the vertical meridian V-V, the light-blocking ratio decreases continuously and at a constant rate throughout the side gradient region 30, diminishing from maximum value M at the temporal edge 22 to minimum value m at approximately 40 degrees in the temporal direction from the vertical meridian V-V. The light-blocking ratio then remains constant at m throughout the central region 32, which extends all the way to the nasal edge 24 of the lens. The constant low light-blocking ratio of this elongated central region 32 provides a relatively wide, unrestricted field of lateral vision at far and middle distances, allowing the wearer to see clearly even while driving or participating in outdoor activities such as skiing.

Figure 6:
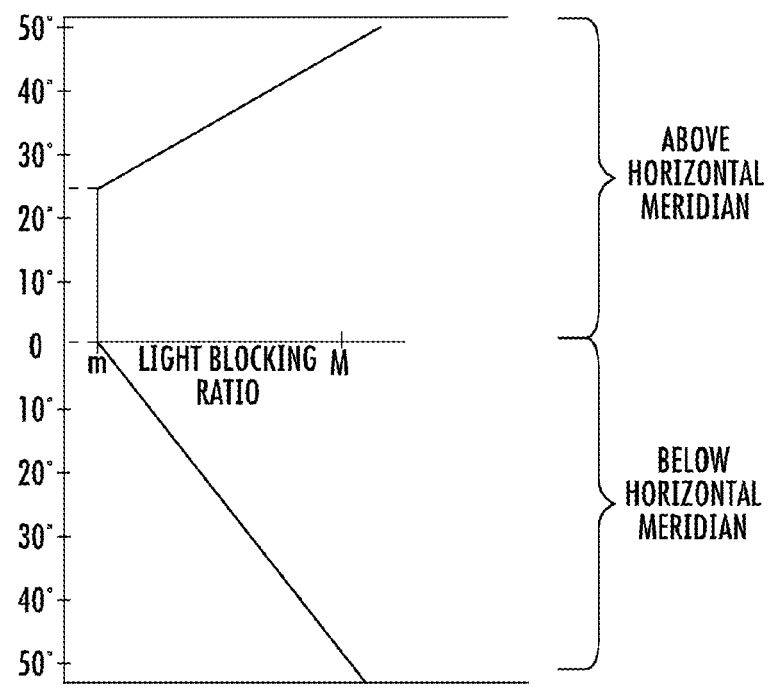
FIG. 6 is a table showing the distribution of the light-blocking ratio as a function of the lateral viewing angle, for the lens of FIG. 2.

FIG. 6 shows the distribution of the light-blocking ratio as a function of vertical angle from the horizontal meridian H-H of the lens, as measured under indoor lighting conditions. Once again, the distribution is the same for outdoor lighting conditions, except that the values m and M are increased by an amount dependent on the brightness of the surrounding light. The light-blocking ratio is constant at m throughout the central region 32, which extends from the horizontal meridian H-H to about 25° above the horizontal meridian H-H. The light blocking ratio increases from m at 25° above the horizontal meridian H-H to M at the upper edge 18 of the lens, thus defining upper gradient 26. The light blocking ratio also increases from m at the horizontal meridian H-H to M at the lower edge 20 of the lens, thus defining lower gradient 28.

In the example of FIGS. 4 and 6, the rate at which the light blocking ratio increases is constant and continuous, and the same in both the upward and downward directions. In other examples, however, the ratio could increase in a variable or step-wise fashion, and could be different in each direction.

Figure 3:
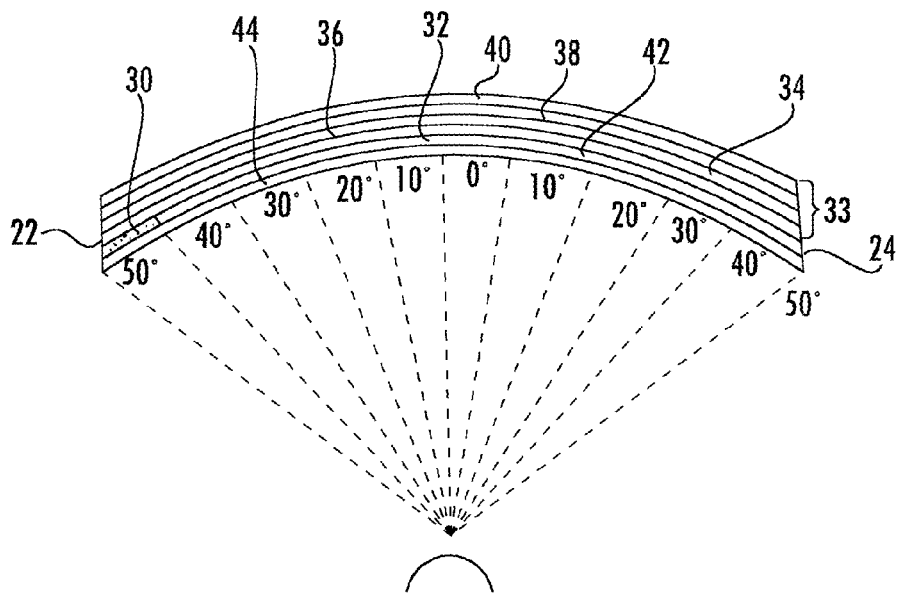
FIG. 3 is a sectional view taken through the horizontal median H-H of the lens of FIG. 2.
Figure 5:
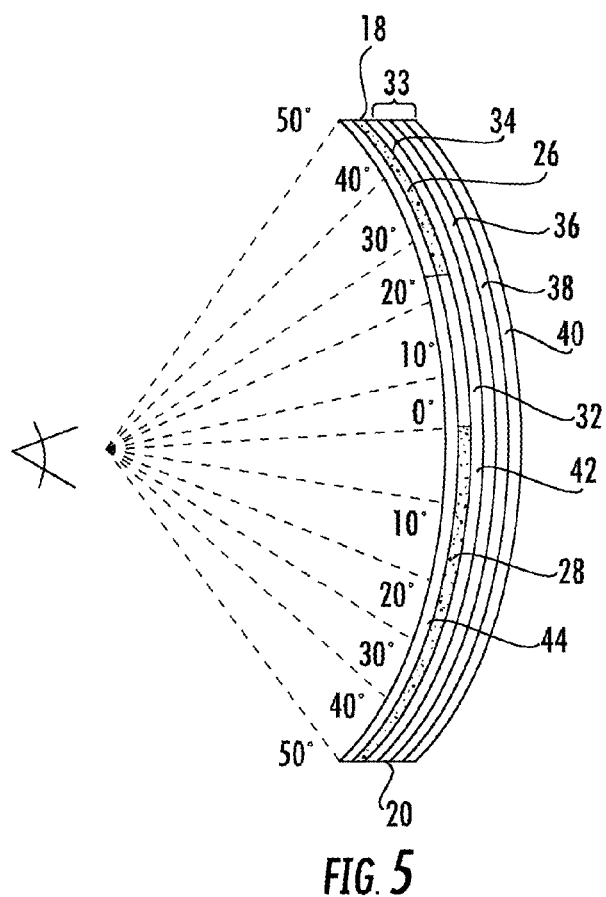
FIG. 5 is a sectional view taken through the vertical median V-V of the lens of FIG. 2.

A method of manufacturing eyewear according to the present disclosure will now be described, with reference to the sectional views of FIGS. 3 and 5. Initially, a semi-finished photochromic lens 13, such as a TRANSITIONS® XTRACTIVE® lens, is provided. The photochromic lens 13 may include a substrate 34 formed of optical glass or plastic, and a photochromic layer 36, which has been integrated either below the surface of the substrate 34 using an imbibing process, or on the surface of the substrate 34 using a transbonding process. A protective coating 38 may be disposed over the photochromic layer 36, and a scratch resistant layer 40 may be disposed over the protective coating 38. The photochromic lens 13 may be either a plain lens or a prescription lens that has already ground or otherwise formed to the correct prescription.

Once the semi-finished photochromic lens 13 has been provided, a liquid hardcoat 42 is applied to the back surface of substrate 34 using a spinning process, and then cured using ultraviolet light. Next, the lens is edged down to fit its intended frame. After etching, the gradients 26, 28, and 28 are created by dipping the upper edge 18, lower edge 20, or temporal edge 22 into a bath of dye solution such as, for instance, Optisafe Gray C250 from Phantom Research Laboratories, Inc. of El Cajon, Calif. or similar, and then rotating the lens 13 so that all the edges except the nasal edge 24 are immersed in the dye. The lens 13 is continuously rotated back and forth between edges 18, 20, and 24 for a predetermined amount of time, until the hardcoated portion 42 of each edge 18, 20, 24 has absorbed a desired amount of dye. When the desired amount of dye has been absorbed in the hardcoat 42, the lens 13 is slowly withdrawn, while still being rotated back and forth between the three edges 18, 20, 24. The concentration of dye absorbed by the hardcoat 42 is proportional to the length of time in the dye bath. Thus, the portion of the lens 13 remaining in the dye the longest (ie. the first portion to be inserted into the dye and the last portion to be withdrawn) will be the darkest and will have the highest light-blocking ratio, while the portion of the lens spending the least amount of time in the dye (ie. the last portion to be inserted into the dye and the first portion to be withdrawn) will be the lightest, and will have the lowest light-blocking ratio. This results in three gradients: upper gradient 26, which increases in the direction of upper edge 18, lower gradient 28, which increases in the direction of lower edge 20, and side gradient 30, which increases in the direction of temporal edge 22.

After the gradient regions 26, 28, and 30 have been created, anti-glare material or anti-reflecting clear coat 44, such as those from Essilor of America, Inc. (www.essilorusa.com) may applied to the back side of side 34 of the substrate over the tinted hardcoat 42. In certain embodiments, the anti-glare material 44 is applied on both sides of the lens. The anti-glare material 44 is applied by placing the clean lenses on rotating racks in a coating chamber. The coating chamber is operated to ionize the lenses thereby generating electrons on them and to vaporize anti-glare material. The vaporized anti-glare material bonds with the ionized lenses. The coated lens is then cut, polished, and mounted in an eyeglass frame 12. The above manufacturing steps may be interchanged, or some of the manufacturing steps above may be omitted and still fall within the scope of the present disclosure.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An eyeglass lens comprising;
a horizontal meridian;
a vertical meridian;
an upper edge,
a lower edge,
a nasal edge,
a temporal edge, and
a substantially rectangular central region, the central region including a perimeter and having a uniform light blocking ratio throughout its entirety, the light-blocking ratio having a minimum value;
a first gradient region extending from the perimeter of the central region to the upper edge, the first gradient region having a light blocking ratio that increases from the minimum value at the perimeter of the central region to a maximum value at the upper edge
a second gradient region extending from the perimeter of the central region to the temporal edge, the second gradient region having a light blocking ratio that increases from the minimum value at the perimeter of the central region to the maximum at the temporal edge; and
a third gradient region extending from the perimeter of the central region to the lower edge, the third gradient region having a light blocking ratio that increases from the minimum value at the perimeter of the central region to a maximum value at the lower edge;
wherein the central region is bounded on one side by the second gradient region and on an opposite side by the nasal edge of the lens.

\* \* \* \* \*